United States Patent
Chapman et al.

(10) Patent No.: US 9,253,011 B2
(45) Date of Patent: Feb. 2, 2016

(54) SESSION-SERVER AFFINITY FOR CLIENTS THAT LACK SESSION IDENTIFIERS

(71) Applicant: INTUIT INC., Mountain View, CA (US)

(72) Inventors: Raymond J. Chapman, San Jose, CA (US); Randall J. Geyer, Frisco, TX (US); Yexin Huang, Plano, TX (US)

(73) Assignee: INTUIT INC., Mountain View, CA (US)

( * ) Notice: Subject to any disclaimer, the term of this patent is extended or adjusted under 35 U.S.C. 154(b) by 316 days.

(21) Appl. No.: 13/653,299

(22) Filed: Oct. 16, 2012

(65) Prior Publication Data

US 2014/0089387 A1     Mar. 27, 2014

Related U.S. Application Data

(60) Provisional application No. 61/706,677, filed on Sep. 27, 2012.

(51) Int. Cl.
*H04L 29/06* (2006.01)
*H04L 29/08* (2006.01)

(52) U.S. Cl.
CPC ............ *H04L 29/0619* (2013.01); *H04L 67/02* (2013.01); *H04L 67/142* (2013.01)

(58) Field of Classification Search
USPC .......................... 709/223, 224, 203, 217, 219
See application file for complete search history.

(56) References Cited

U.S. PATENT DOCUMENTS

| | | | |
|---|---|---|---|
| 6,226,750 B1 * | 5/2001 | Trieger | 726/3 |
| 6,336,135 B1 | 1/2002 | Niblett et al. | |
| 6,678,791 B1 * | 1/2004 | Jacobs et al. | 711/118 |
| 6,785,769 B1 * | 8/2004 | Jacobs et al. | 711/118 |
| 6,789,170 B1 * | 9/2004 | Jacobs | G06F 17/30902 707/E17.12 |
| 7,103,714 B1 * | 9/2006 | Jacobs et al. | 711/113 |
| 7,197,568 B2 | 3/2007 | Bourne et al. | |
| 7,634,570 B2 * | 12/2009 | Paya et al. | 709/227 |
| 7,921,152 B2 * | 4/2011 | Ashley et al. | 709/203 |
| 8,135,850 B2 | 3/2012 | Narayana et al. | |
| 8,335,819 B2 | 12/2012 | Fu | |
| 8,732,855 B2 * | 5/2014 | Thomas et al. | 726/29 |
| 2003/0177196 A1 * | 9/2003 | Bhasin et al. | 709/213 |
| 2006/0195545 A1 * | 8/2006 | Kikkawa et al. | 709/217 |
| 2006/0277596 A1 * | 12/2006 | Calvert et al. | 726/3 |
| 2012/0017004 A1 * | 1/2012 | Furbeck | 709/231 |
| 2012/0173606 A1 * | 7/2012 | Becker | 709/203 |
| 2012/0210446 A1 * | 8/2012 | Reed et al. | 726/28 |
| 2014/0068245 A1 * | 3/2014 | Kanekar | 713/151 |

* cited by examiner

*Primary Examiner* — Lashonda Jacobs
(74) *Attorney, Agent, or Firm* — Park, Vaughan, Fleming & Dowler LLP; Chia-Hsin Suen

(57) ABSTRACT

The disclosed embodiments provide a system that facilitates interaction between a client and a web application. During operation, the system identifies a request that lacks a session identifier from the client to the web application. Next, the system obtains a client identifier associated with the client from the request. If a cached session identifier is found for the client identifier, the system adds the cached session identifier to the request. Finally, the system forwards the request to the web application.

12 Claims, 4 Drawing Sheets

SESSION-SERVER AFFINITY FOR CLIENTS THAT LACK SESSION IDENTIFIERS

RELATED APPLICATION

This application hereby claims priority under 35 U.S.C. §119 to U.S. Provisional Application No. 61/706,677, entitled "Session-Server Affinity for Clients that Lack Session Identifiers" by Raymond J. Chapman, Randall J. Geyer and Yexin Huang, filed 27 Sep. 2012.

BACKGROUND

Related Art

The disclosed embodiments relate to session-server affinity. More specifically, the disclosed embodiments relate to techniques for providing session-server affinity to clients that lack session identifiers.

SUMMARY

The disclosed embodiments provide a system that facilitates interaction between a client and a web application. During operation, the system identifies a request that lacks a session identifier from the client to the web application. Next, the system obtains a client identifier associated with the client from the request. If a cached session identifier is found for the client identifier, the system adds the cached session identifier to the request. Finally, the system forwards the request to the web application.

In some embodiments, if the cached session identifier is not found for the client identifier, the system identifies a response to the request from the web application and caches the session identifier from the response for use with subsequent requests from the client.

In some embodiments, caching the session identifier involves mapping the session identifier from the response to the client identifier.

In some embodiments, the response is identified using at least one of the client identifier and a flag indicating an absence of the cached session identifier for the client.

In some embodiments, the system also deletes the cached session identifier after a period of inactivity from the client.

In some embodiments, the lack of the session identifier in the request is identified based on a type of the request.

In some embodiments, the cached session identifier is added to the request using a cookie.

In some embodiments, the client identifier is associated with at least one of a user, a group of users, and an organization.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
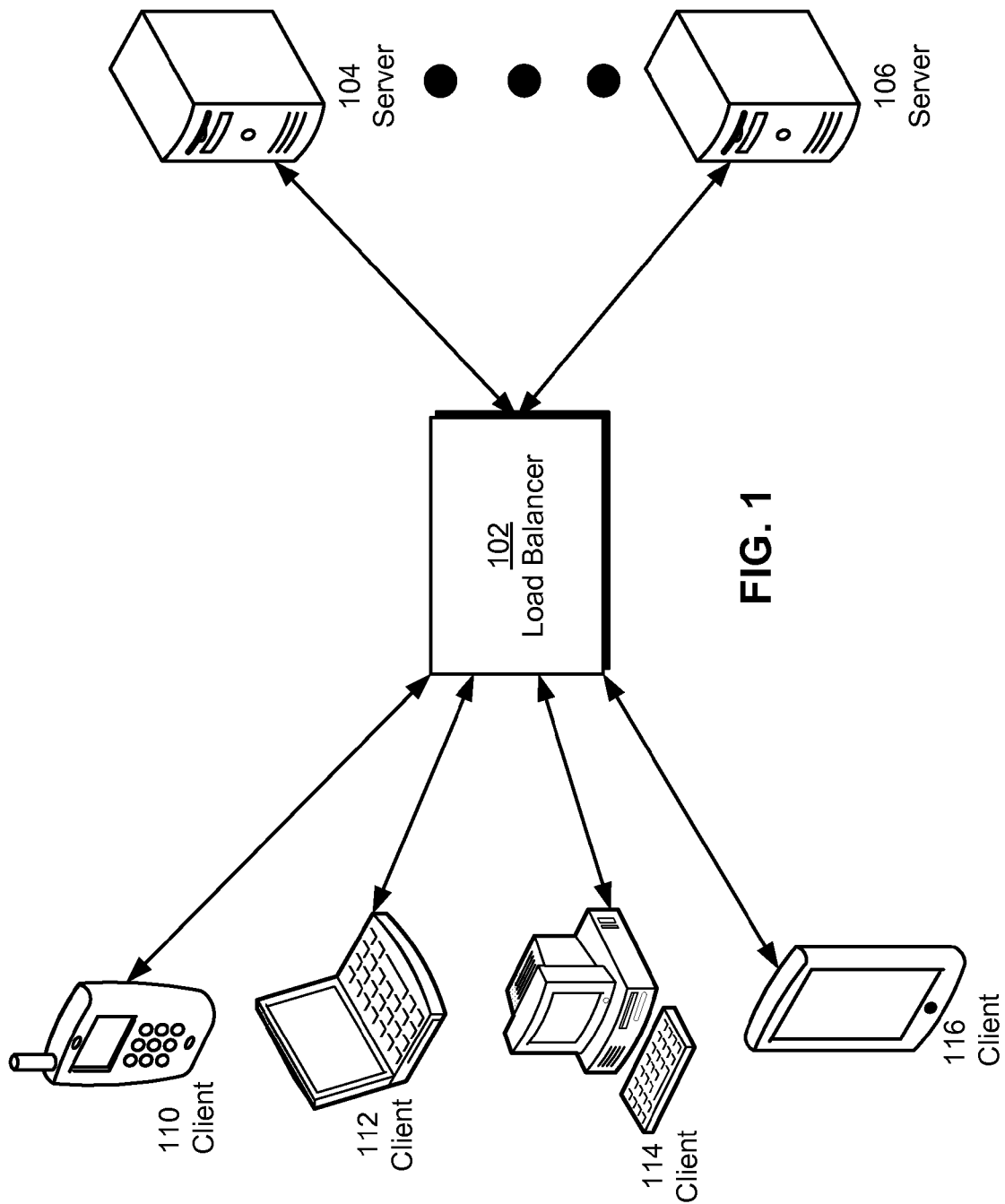
FIG. 1 shows a schematic of a system in accordance with the disclosed embodiments.

The disclosed embodiments provide a method and system for facilitating interaction between a client and a web application. As shown in FIG. 1, a set of clients 110-116 may access the web application by communicating with a set of servers 104-106 providing the web application. Clients 110-116 may be desktop computers, laptop computers, mobile phones, personal digital assistants, tablet computers, portable media players, and/or other network-enabled electronic devices. Similarly, servers 104-106 may be physical and/or virtual web servers, application servers, and/or other types of servers used to provide the web application to users of clients 110-116. In other words, the web application may be implemented using a client-server architecture. Components of the web application may be deployed and executed on one or more servers 104-106 and accessed from other machines (e.g., clients 110-116) using a locally installed executable, a command-line interface, and/or a web browser and network connection.

During use of the web application, a user of a client (e.g., clients 110-116) may authenticate with the web application to obtain one or more resources from the web application. For example, the user may use the client to provide a login and password, biometric identifier, personal identification number (PIN), certificate, and/or other authentication credentials to the web application, along with a HyperText Transfer Protocol (HTTP) request for a resource (e.g., webpage, data, image, file, service, etc.) from the web application. The authentication credentials may be directed by a load balancer 102 to a server (e.g., servers 104-106), which handles the request by verifying the authentication credentials, loading data associated with the user from a database and/or other repository into memory, and creating and/or providing the resource to the client using the data.

To facilitate subsequent interaction with a client, the server may provide session-server affinity that establishes a session with the client using a session identifier for the session. The session identifier may then be used by the client, load balancer 102, and/or server in subsequent communications to maintain the session. Continuing with the above example, the server may add a cookie containing the session identifier to an HTTP response to the HTTP request, and the client may include the cookie in subsequent HTTP requests to the web application. In turn, load balancer 102 may use the cookie to route the client's requests to the same server, thus allowing the server to respond quickly to the requests using data already loaded into memory instead of requiring other servers to load the data into memory before using the data to generate responses to the requests.

Those skilled in the art will appreciate that cookies and/or other mechanisms for specifying session identifiers in requests may not be supported by all clients 110-116. For example, cookies may not be supported by mobile phones, tablet computers, portable media players, and/or locally installed applications on clients 110-116. The lack of session identifiers in requests from such clients may further prevent load balancer 102 from directing the requests to the appropriate servers 104-106. Instead, requests from the same client may be distributed across multiple servers 104-106, causing data for the client to be replicated in memory on each of the servers and reducing the servers' overall capacities and/or abilities to handle requests. Moreover, the loading of data into memory by each server to handle a request may increase the response time of the server, resulting in reduced performance during use of the web application on some or all clients 110-116.

In one or more embodiments, the system of FIG. 1 includes functionality to enable session-server affinity for clients that do not support cookies and/or other mechanisms for providing session identifiers to the web application. As discussed in further detail below, load balancer 102 and/or another component associated with the web application may maintain a cache that maps client identifiers for clients 110-116 that lack session identifiers to session identifiers for the clients. Load balancer 102 may also identify requests that lack session identifiers and obtain client identifiers associated with the clients from the requests.

If a client identifier from a request is associated with a cached session identifier in the cache, load balancer 102 may add the cached session identifier to the request, thus enabling routing of the request to the appropriate server (e.g., the server that generated the cached session identifier). If the client identifier is not associated with a cached session identifier, load balancer 102 may set a flag indicating an absence of the cached session identifier for the client and use the flag and client identifier to identify a response to the request from the web application. Load balancer 102 may then cache the session identifier from the response for use with subsequent requests from the client to maintain session state for the client until the session has expired.

Figure 2:
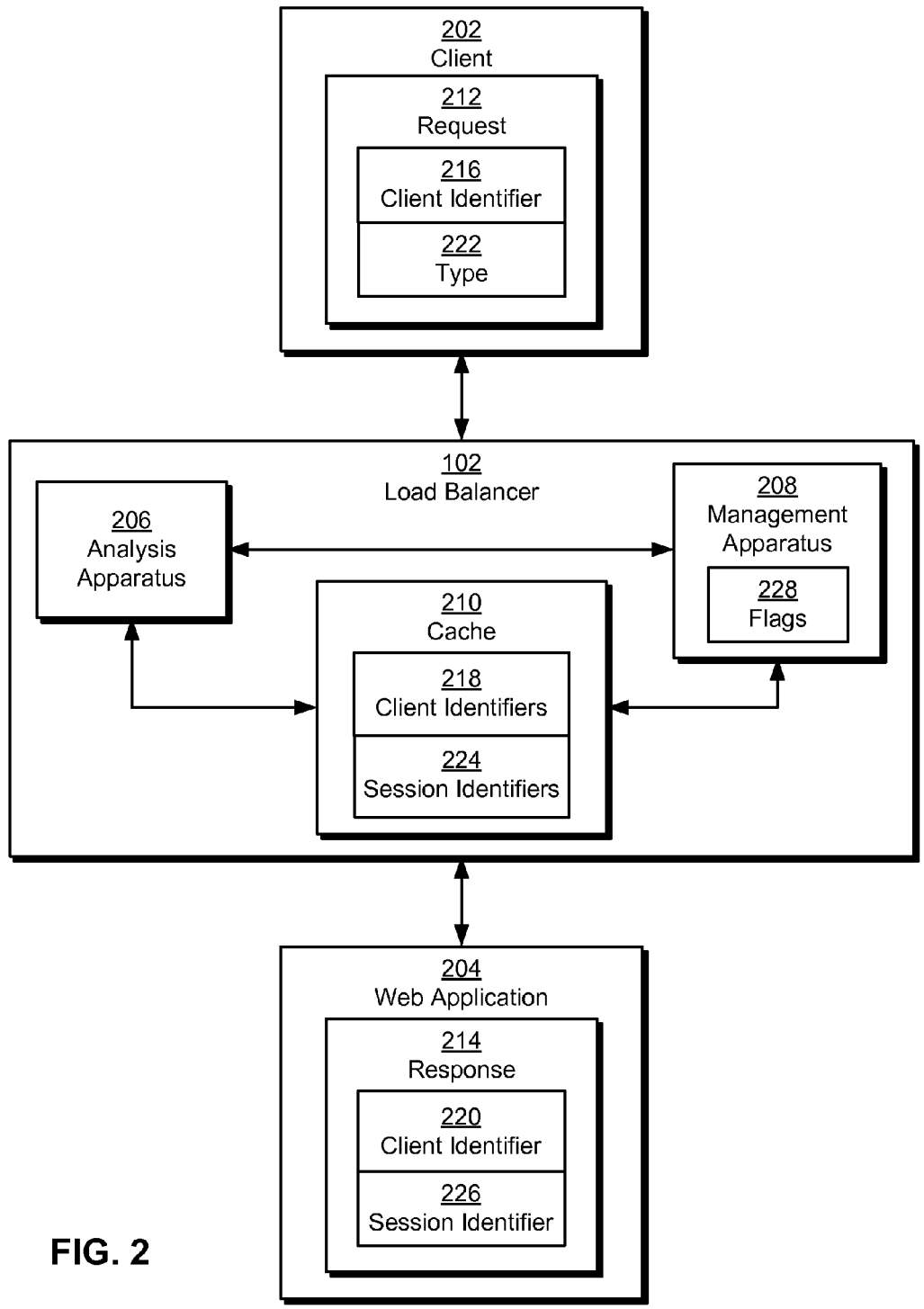
FIG. 2 shows a system for facilitating interaction between a client and a web application in accordance with the disclosed embodiments.

FIG. 2 shows a system for facilitating interaction between a client 202 and a web application 204 in accordance with the disclosed embodiments. As mentioned above, web application 204 may be provided by one or more web servers, application servers, and/or other types of physical and/or virtual servers (e.g., servers 104-106 of FIG. 1). For example, requests from client 202 and/or other clients to web application 204 may be distributed by load balancer 102 among a set of web servers, which further route the requests to a set of application servers that process the requests and/or data associated with the requests. Client 202 may be a mobile phone, tablet computer, portable media player, and/or locally installed application that does not support cookies and/or other mechanisms for specifying session identifiers to web application 204.

To enable session-server affinity for client 202, load balancer 102 may identify a request 212 from client 202 to web application 204 as lacking a session identifier (e.g., session identifier 226). In particular, an analysis apparatus 206 in load balancer 102 may detect the lack of session identifier 226 in request 212 based on a type 222 of request 212. For example, web application 204 may process different types of requests from client 202 and/or other types of clients, with the type of each request indicated by the Uniform Resource Locator (URL) of the request. As a result, analysis apparatus 206 may identify request 212 as sessionless if the URL of request 212 represents a request type 222 that does not include session state information and/or lacks a cookie containing a session identifier.

Next, analysis apparatus 206 may obtain a client identifier 216 for client 202 from request 212. As with type 222, client identifier 216 may be specified in a URL of request 212. For example, client identifier 216 may be obtained from a path within the URL and represent a user, a group of users, an organization, and/or another entity that interacts and/or maintains a set of data with web application 204.

Once client identifier 216 is obtained, analysis apparatus 206 may search a cache 210 for a cached session identifier associated with client identifier 216. For example, cache 210 may include a table and/or other structure that maps client identifiers 218 for clients that lack session identifiers (e.g., client 202) to session identifiers 224 for the clients from web application 204. As a result, analysis apparatus 206 may use client identifier 216 as a key to an entry in cache 210 that contains the cached session identifier for client 202. If the entry is found, the cached session identifier may be used to provide session-server affinity for client 202. If the entry is not found, no cached session identifier may exist for the client, and session-server affinity may be postponed until web application 204 provides session identifier 226, as described in detail below.

In particular, if analysis apparatus 206 finds a cached session identifier among session identifiers 224 that is associated with client identifier 216, a management apparatus 208 in load balancer 102 may add the cached session identifier to request 212 and forward the request to web application 204. For example, management apparatus 208 may add the cached session identifier to request 212 using a cookie. The cookie may then be used to route request 212 to a server associated with the cached session identifier. For example, request 212 may be routed to an application server that initially generated the cached session identifier and/or has session data for client 202 loaded into memory.

On the other hand, if analysis apparatus 206 does not find a cached session identifier for client identifier 216, request 212 may correspond to a request from client 202 that does not have an existing session with web application 204. As a result, management apparatus 208 may not add a session identifier to request 212 before forwarding request 212 to web application 204. Instead, management apparatus 208 may update a set of flags 228 for outstanding requests from clients of web application 204 with a flag indicating an absence of the cached session identifier for client 202 and/or client identifier 216.

Management apparatus 208 may then identify a response 214 to request 212 from web application 204 and cache session identifier 226 from response 214 for use with subsequent requests from client 202. For example, management apparatus 208 may obtain a client identifier 220 from response 214 and match client identifier 220 to client identifier 216 and/or the flag for client identifier 216 from flags 228. Management apparatus 208 may then add session identifier 226 to cache 210 by mapping session identifier 226 to client identifier 216 within an entry in cache 210. Finally, management apparatus 208 may forward response 214 to client 202 and remove the flag from flags 228 to indicate the completion of a request-response round corresponding to client identifier 216. If client identifier 220 does not match any flags 228 set by management apparatus 208, session identifier 226 may already be stored in cache 210, and management apparatus 208 may forward response 214 to client 202 without updating cache 210.

As described above, client identifier 216 may be associated with multiple users within a group, organization, and/or other entity. For example, client identifier 216 may represent a company that stores and manages data for the company using web application 204. Client identifier 216 may thus be included in requests from multiple clients to web application 204, as multiple users from the company access web application 204. Moreover, analysis apparatus 206 and/or management apparatus 208 may also add the same session identifier to the requests, causing the requests to be routed to one server that processes the requests using a single copy of the data rather than multiple servers with separate copies of the data loaded into memory.

To further improve the security and/or performance of web application 204, management apparatus 208 may delete the cached session identifier after a period of inactivity from client 202 and/or other clients associated with client identifier 216. For example, management apparatus 208 may evict the entry containing client identifier 216 and session identifier 226 from cache 210 if requests containing client identifier 216 are not received for 15 minutes. A subsequent request containing client identifier 216 may thus be processed as a "new" request and directed to a server that establishes a new session by including a new session identifier in a response to the request. The new session identifier may then be stored in cache 210 and used to direct requests to the server until another 15-minute period of inactivity has passed.

Such use of client identifiers 216-220, session identifiers 224-226, cache 210, and/or flags 228 to process requests and responses may enable session-server affinity for clients that do not support cookies and/or other mechanisms for maintaining session state. In turn, the system of FIG. 2 may allow requests associated with the same set of data to be fulfilled by the same server, thus preventing duplication of the data across multiple servers and increasing the scalability and responsiveness of web application 204. Finally, the removal of entries from cache 210 after periods of inactivity may facilitate efficient and/or safe use of web application 204 by preventing data associated with the same "session" to be persisted in cache 210 and/or memory on a server indefinitely.

Those skilled in the art will appreciate that the system of FIG. 2 may be implemented in a variety of ways. More specifically, analysis apparatus 206 and management apparatus 208 may be provided by the same hardware and/or software component, or the components may execute independently from one another. For example, the functionality of analysis apparatus 206 and management apparatus 208 may be implemented by a single load balancer 102 and/or component, or analysis apparatus 206 and management apparatus 208 may be implemented by multiple software and/or hardware components. Similarly, analysis apparatus 206 and management apparatus 208 may be provided by a different component associated with web application 204, such as a router.

Figure 3:
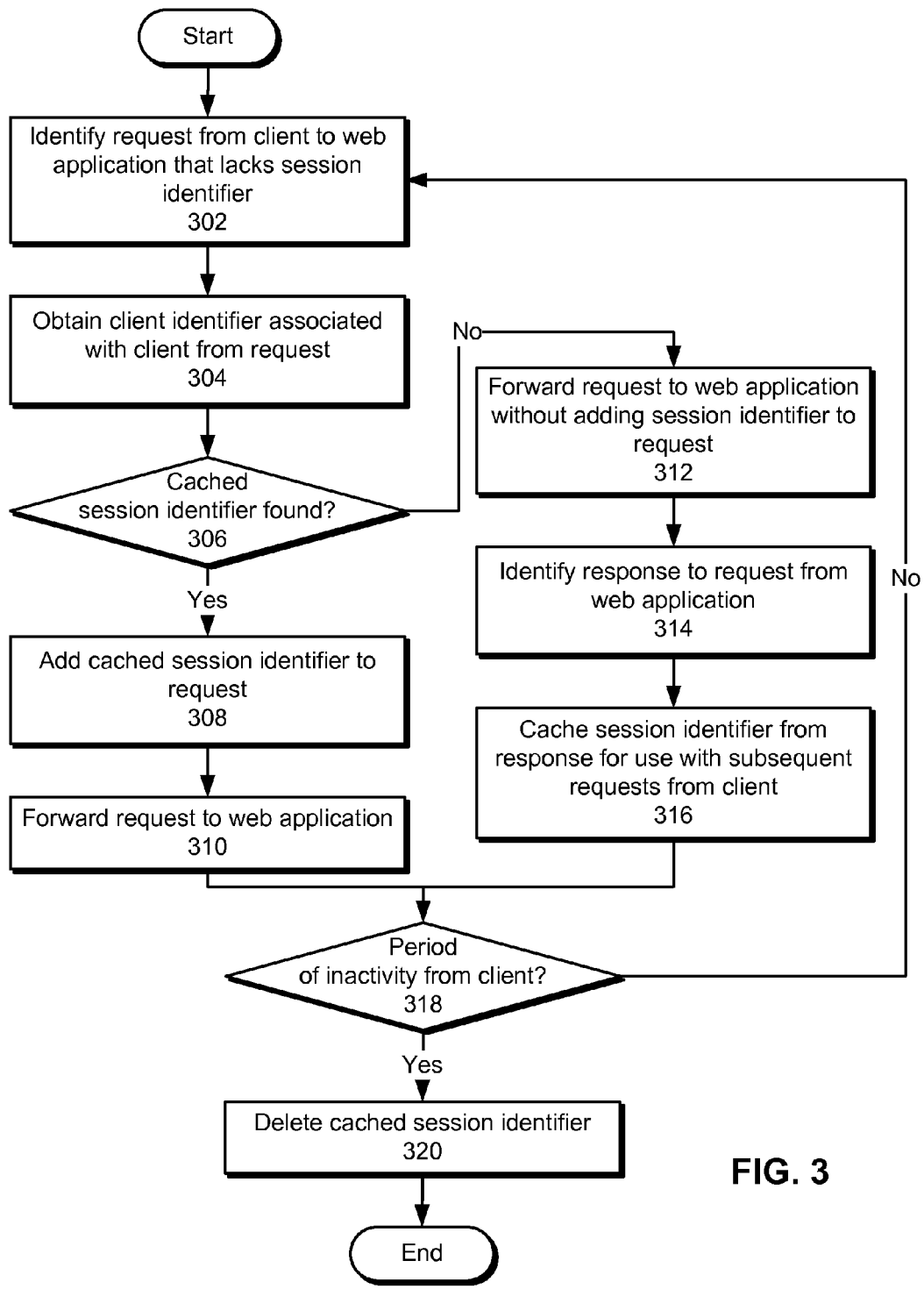
FIG. 3 shows a flowchart illustrating the process of facilitating interaction between a client and a web application in accordance with the disclosed embodiments.

FIG. 3 shows a flowchart illustrating the process of facilitating interaction between a client and a web application in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a request from the client to the web application that lacks a session identifier is identified (operation 302). For example, the request may originate from a mobile phone, tablet computer, portable media player, locally installed application, and/or other client that does not support HTTP cookies. In addition, the lack of session identifier may be identified based on the type of the request and/or a URL of the request.

Next, a client identifier associated with the client is obtained from the request (operation 304). For example, the client identifier may be obtained from the URL of the request. The client identifier may be associated with a user, a group of users, and/or an organization. A cached session identifier may also be found (operation 306) for the client identifier. For example, the client identifier may be used as a key to an entry in a cache that maps client identifiers for clients that lack session state information to session identifiers for the clients.

If the cached session identifier is found, the cached session identifier is added to the request (operation 308), and the request is forwarded to the web application (operation 310). For example, the cached session identifier may be added as a cookie to the request to allow the request to be routed to a server associated with the cached session identifier.

If the cached session identifier is not found, the request is forwarded to the web application without adding a session identifier to the request (operation 312), and a response to the request from the web application is identified (operation 314). For example, a flag indicating an absence of the cached session identifier for the client may be set before the request is forwarded, and the response may be identified using the flag and the same client identifier in the response. The session identifier from the response is then cached for use with subsequent requests from the client (operation 316). For example, a mapping of the session identifier to the client identifier may be added to a cache that is used to maintain session state for requests from clients that lack session identifiers.

Subsequent requests from the client may be processed based on a period of inactivity from the client (operation 318). If the client and/or other clients associated with the client identifier remain active, requests containing the client identifier may be received before the period of inactivity has lapsed. In turn, the requests and client identifier may be identified (operations 302-304), and the cached session identifier may be included in the requests before the requests are forwarded to the web application (operations 306-310).

If no further requests containing the client identifier are received during the period of inactivity (e.g., 15 minutes), the cached session identifier is deleted (operation 320) to remove session state from such requests. After the cached session identifier is deleted, a request containing the client identifier may be processed as a "new" request and directed to a server that establishes a new session by including a new session identifier in a response to the request. A new session identifier for the new session may then be cached for use with subsequent requests containing the client identifier until the new session expires.

Figure 4:
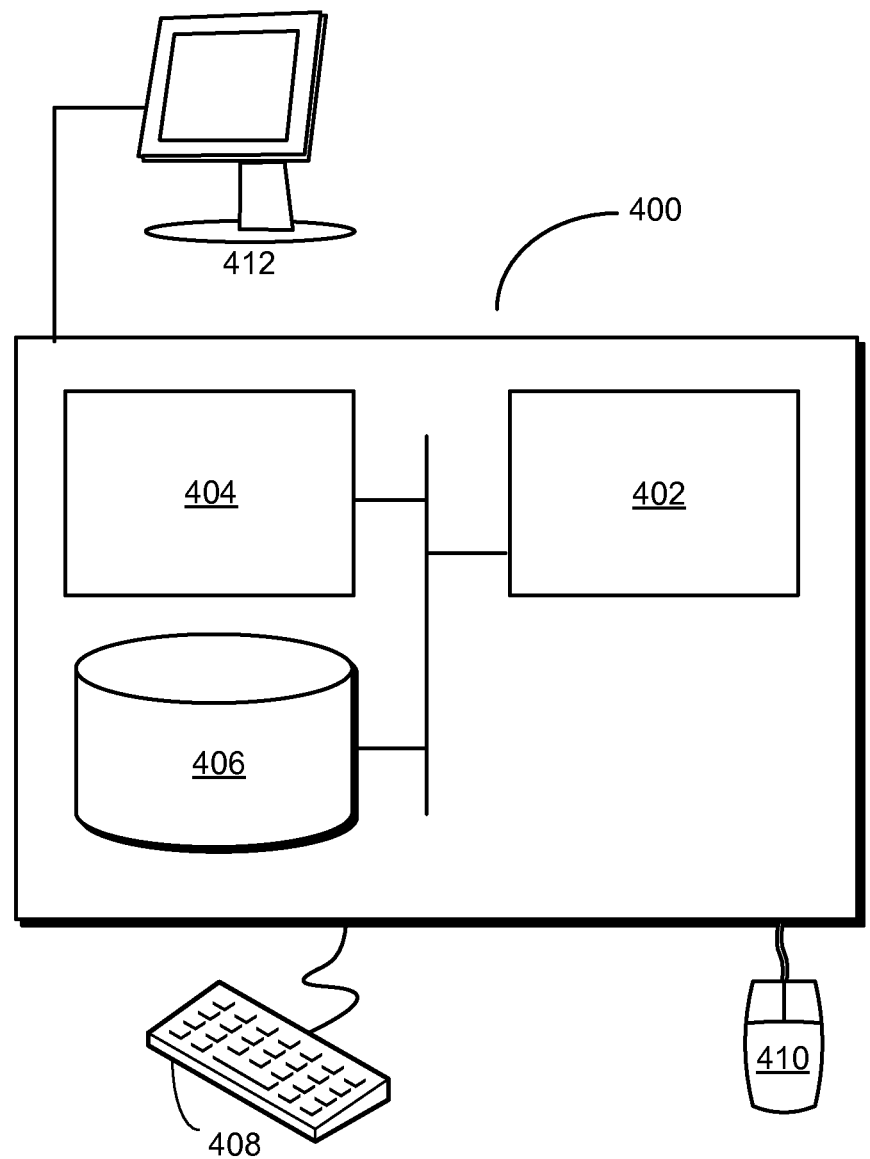
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating interaction between a client and a web application. The system may include an analysis apparatus that identifies a request that lacks a session identifier from the client to the web application and obtains a client identifier associated with the client from the request. The analysis apparatus may also search a cache for a cached session identifier associated with the client identifier. The system may also include a management apparatus that adds the cached session identifier to the request if the cached session identifier is found. The management apparatus may then forward the request to the web application.

The analysis apparatus may further identify a response to the request from the web application if the cached session identifier is not found, and the management apparatus may cache the session identifier from the response for use with subsequent requests from the client. As a result, the analysis apparatus and management apparatus may provide session-server affinity for clients that do not support cookies and/or other mechanisms for providing session identifiers to the web application.

In addition, one or more components of computer system 400 may be remotely located and connected to the other components over a network. Portions of the present embodiments (e.g., analysis apparatus, management apparatus, etc.) may also be located on different nodes of a distributed system that implements the embodiments. For example, the present embodiments may be implemented using a cloud computing system that provides session-server affinity to clients interacting with a web application executing within the cloud computing system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating interaction between a client and a web application via an intermediary device, comprising:
   receiving, at a device, a request from a client, wherein the request is directed to a web application executing on a plurality of servers, wherein the request lacks a session identifier, and wherein the client lacks the ability to provide session identifiers;
   obtaining a client identifier associated with the client from a Uniform Resource Locator (URL) associated the request;
   querying a cache with the client identifier to determine if a session identifier associated with the client identifier exists in the cache;
   if so, adding the session identifier to the request, wherein the device maintains the session identifier on behalf of the client, and wherein the session identifier is a separate identifier from the client identifier;
   forwarding the request to the web application.

2. The computer-implemented method of claim 1, further comprising:
   if the session identifier associated with the client identifier does not exist in the cache, identifying a response to the request from the web application; and
   caching the session identifier from the response for use with subsequent requests from the client.

3. The computer-implemented method of claim 1, further comprising:
   deleting the session identifier from the cache after a period of inactivity from the client.

4. The computer-implemented method of claim 1, further comprising:
   wherein the session identifier in the request from the device to the web application and in the response from the web application to the device is in a cookie; and
   wherein the session identifier in the request from the client to the device and in the response from the device to the client is not in a cookie.

5. A non-transitory computer-readable storage medium storing instructions that when executed by a computer cause the computer to perform a method for facilitating interaction between a client and a web application via an intermediary device, the method comprising:
   receiving, at a device, a request from a client, wherein the request is directed to a web application executing on a plurality of servers, wherein the request lacks a session identifier, and wherein the client lacks the ability to provide session identifiers;
   obtaining a client identifier associated with the client from a Uniform Resource Locator (URL) associated the request;
   querying a cache with the client identifier to determine if a session identifier associated with the client identifier exists in the cache;
   if so, adding the session identifier to the request, wherein the device maintains the session identifier on behalf of the client, and wherein the session identifier is a separate identifier from the client identifier;
   forwarding the request to the web application.

6. The non-transitory computer-readable storage medium of claim 5, wherein the method further comprises:
   if the session identifier associated with the client identifier does not exist in the cache, identifying a response to the request from the web application; and
   caching the session identifier from the response for use with subsequent requests from the client.

7. The non-transitory computer-readable storage medium of claim 5, wherein the method further comprises:
   deleting the session identifier from the cache after a period of inactivity from the client.

8. The non-transitory computer-readable storage medium of claim 5, wherein the method further comprises:
wherein the session identifier in the request from the device to the web application and in the response from the web application to the device is in a cookie; and
wherein the session identifier in the request from the client to the device and in the response from the device to the client is not in a cookie.

9. A system for facilitating interaction between a client and a web application via an intermediary device, comprising:
a memory;
a processor;
a non-transitory computer-readable storage medium storing instructions that when executed by the processor cause the system to perform a method for facilitating interaction between a client and a web application, the method comprising:
receiving, at the system, a request from a client, wherein the request is directed to a web application executing on a plurality of servers, wherein the request lacks a session identifier, and wherein the client lacks the ability to provide session identifiers;
obtaining a client identifier associated with the client from a Uniform Resource Locator (URL) associated the request;
querying a cache with the client identifier to determine if a session identifier associated with the client identifier exists in the cache;
if so, adding the session identifier to the request, wherein the device maintains the session identifier on behalf of the client, and wherein the session identifier is a separate identifier from the client identifier;
forwarding the request to the web application.

10. The system of claim 9, further comprising:
if the session identifier associated with the client identifier does not exist in the cache, identifying a response to the request from the web application; and
caching the session identifier from the response for use with subsequent requests from the client.

11. The system of claim 9, further comprising:
deleting the session identifier from the cache after a period of inactivity from the client.

12. The system of claim 9, further comprising:
wherein the session identifier in the request from the system to the web application and in the response from the web application to the system is in a cookie; and
wherein the session identifier in the request from the client to the system and in the response from the system to the client is not in a cookie.

* * * * *